United States Patent
Firestone et al.

(10) Patent No.: US 7,916,653 B2
(45) Date of Patent: Mar. 29, 2011

(54) MEASUREMENT OF ROUND-TRIP DELAY OVER A NETWORK

(75) Inventors: Scott Firestone, Mountain View, CA (US); Randall B. Baird, Austin, TX (US); Wing Cheong Chau, Los Altos Hills, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 638 days.

(21) Appl. No.: 11/516,933

(22) Filed: Sep. 6, 2006

(65) Prior Publication Data
US 2008/0056154 A1 Mar. 6, 2008

(51) Int. Cl.
*G01R 31/08* (2006.01)
*H04L 12/66* (2006.01)

(52) U.S. Cl. .......................................... 370/252; 370/352
(58) Field of Classification Search .................. 370/252, 370/503
See application file for complete search history.

(56) References Cited

U.S. PATENT DOCUMENTS

| | | | | |
|---|---|---|---|---|
| 5,820,463 | A | * | 10/1998 | O'Callaghan .................... 463/42 |
| 5,953,049 | A | * | 9/1999 | Horn et al. .................. 348/14.09 |
| 6,016,430 | A | * | 1/2000 | Shinomiya ..................... 455/515 |
| 6,044,081 | A | | 3/2000 | Bell et al. |
| 6,545,979 | B1 | * | 4/2003 | Poulin ........................ 370/241.1 |
| 6,771,644 | B1 | | 8/2004 | Brassil et al. |
| 6,947,417 | B2 | | 9/2005 | Laursen et al. |
| 7,422,330 | B2 | * | 9/2008 | Magarill .......................... 353/31 |
| 2002/0014282 | A1 | | 2/2002 | Andersson et al. |
| 2002/0051464 | A1 | * | 5/2002 | Sin et al. ........................ 370/466 |
| 2003/0035384 | A1 | * | 2/2003 | Cline et al. .................... 370/286 |
| 2003/0076850 | A1 | | 4/2003 | Jason, Jr. |
| 2004/0193974 | A1 | * | 9/2004 | Quan et al. .................... 714/724 |
| 2004/0213152 | A1 | | 10/2004 | Matuoka et al. |
| 2007/0008896 | A1 | * | 1/2007 | Green et al. .................. 370/249 |
| 2007/0121523 | A1 | * | 5/2007 | Morandin ..................... 370/252 |

FOREIGN PATENT DOCUMENTS

EP 1 553 735 A1 7/2005
* cited by examiner

*Primary Examiner* — Derrick W Ferris
*Assistant Examiner* — Angel Brockman
(74) *Attorney, Agent, or Firm* — The Law Offices of Bradley J. Bereznak

(57) ABSTRACT

In one embodiment, a first audio waveform is produced at a first side of a network connection and then encoded and sent by a first endpoint device to a second endpoint device at a second side of the network connection. A second audio waveform is then detected after being played out by the first endpoint device, the second audio waveform having been produced at the second side of the network connection in response to the second endpoint device playing out the first audio waveform. A round-trip delay is then calculating based on a time period measured from output of the first audio waveform to detection of the second audio waveform. It is emphasized that this abstract is provided to comply with the rules requiring an abstract that will allow a searcher or other reader to quickly ascertain the subject matter of the technical disclosure.

15 Claims, 8 Drawing Sheets

MEASUREMENT OF ROUND-TRIP DELAY OVER A NETWORK

TECHNICAL FIELD

The present invention relates generally to the fields of data networks and network signaling path measurements.

BACKGROUND

The mouth-to-ear latency or delay of data packet streams in rich-media conferences often determines the usability of interaction for the participants. To simplify measurement, latencies are often computed as round-trip latencies; that is, double the one-way or unidirectional mouth-to-ear latency. By way of example, round-trip audio latencies in excess of 100 milliseconds degrade conference quality, since the delay between one participant speaking and a next participant speaking causes interruptions and overlap to occur. A conference with round-trip audio latencies of 300 milliseconds suffers such severely degraded audio quality that the conference participants are usually dissatisfied with the experience.

Round-trip delay of media streams in conferencing systems is a function of many factors, including packet formation delay, network latency, jitter, and other computation phenomena involved in rendering media. End users today have no easy way of determining point-to-point or round-trip latency for a given (i.e., arbitrary) conferencing or telephony system. Some conferencing systems have built-in latency measurement tools; however, those tool are generally incapable of measuring the overall delay (i.e., from the mouth speaking into a microphone on an endpoint device, through the conferencing bridge/mixer/server, to the ear listening to a loudspeaker on another endpoint). Furthermore, such systems do not always work with third-party endpoint devices. These systems also fail to measure delays in the case of two or more interworking conferencing systems.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

Figure 1:
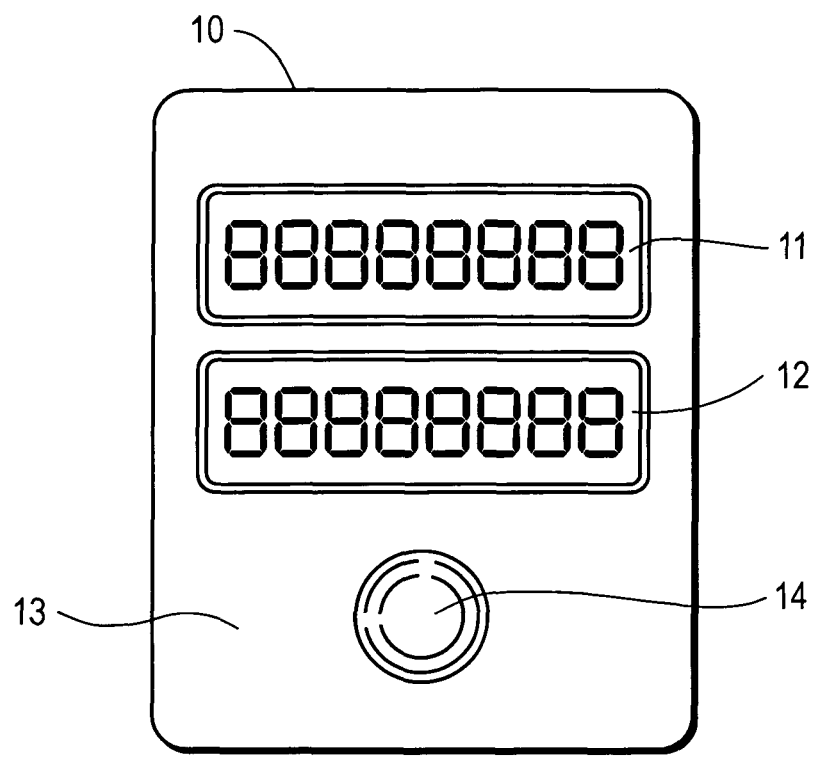
FIG. 1 is a front view of an example apparatus for measuring round-trip audio latency.
Figure 2:
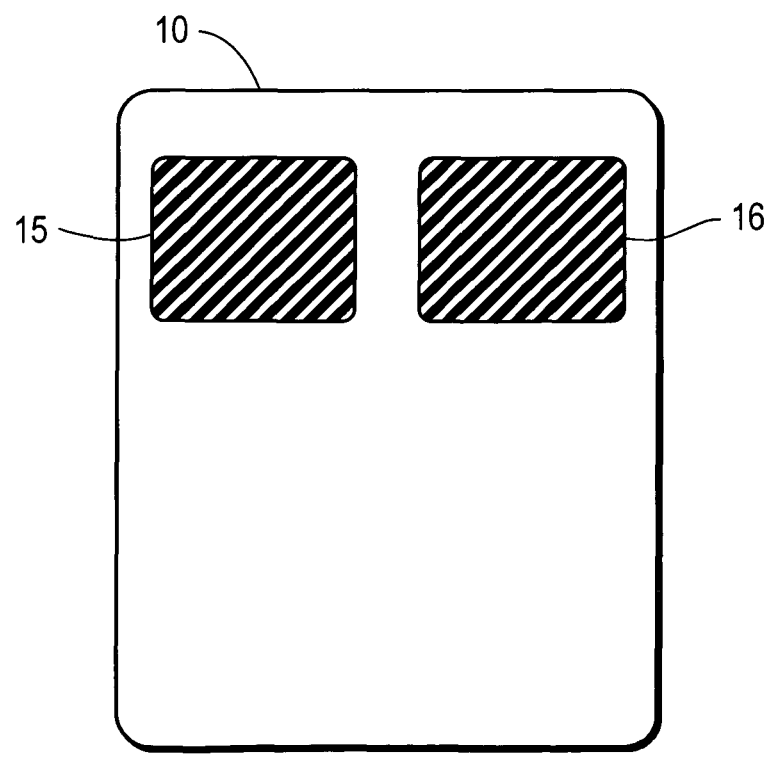
FIG. 2 is a rear view of the apparatus shown in FIG. 1.

FIG. 1 is a front view of an apparatus for measuring round-trip audio delay. In the embodiment shown, a stand-alone, audio "ping check" apparatus 10 is provided that precisely measures the round-trip or one-way delay in an audio conference. Apparatus 10 comprises a housing 13 having a front side that includes a start button 14 and a pair of digital liquid crystal display (LCD) panels 11 & 12 which display the average delay time and variance, respectively, for a given measurement. The back side or rear of housing 13 (shown in FIG. 2) includes a small microphone 15 and speaker 16.

Figure 3:
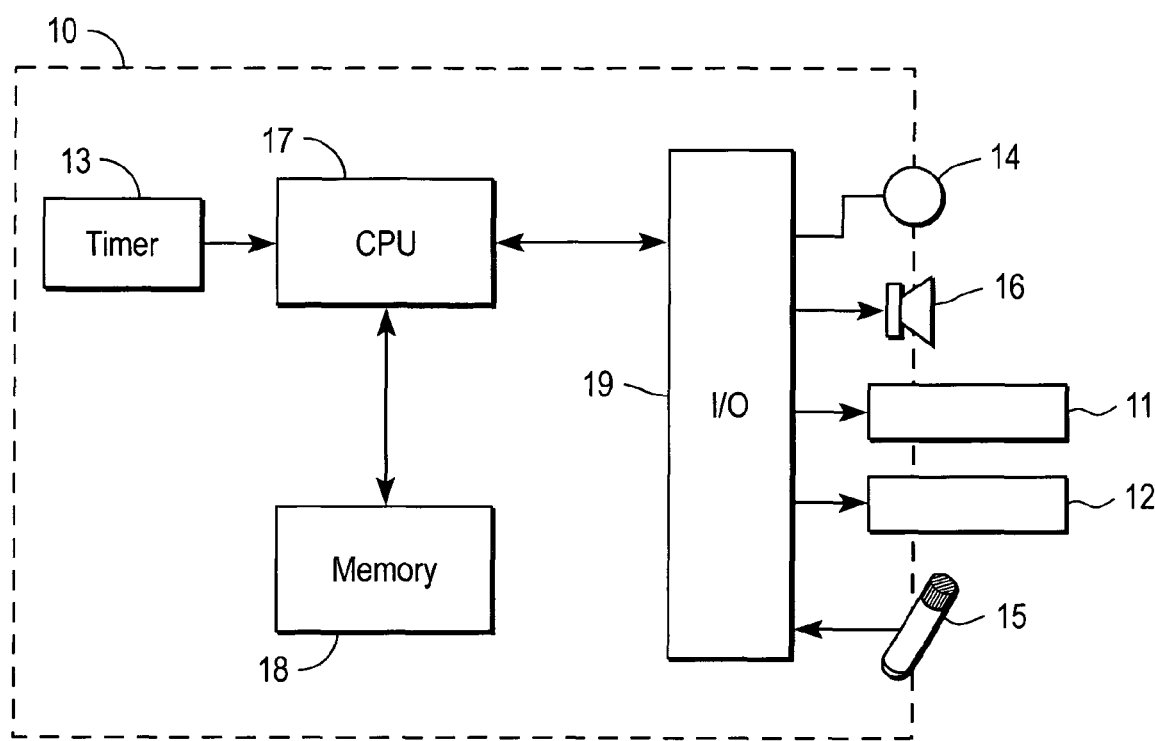
FIG. 3 is a diagram illustrating the basic electronic components enclosed within an example latency measurement apparatus.

FIG. 3 is a block diagram illustrating the basic electronic components enclosed within housing 13 of apparatus 10. As can be seen, start button 14, microphone 15, speaker 16, and display panels 11 & 12 interface with an input/output (I/O) unit 19 that is coupled with a central processing unit (CPU) 17. CPU 17 is coupled with a memory (e.g., RAM) 18. CPU 17 operates to calculate the average delay based on a series of audio ping waveforms sent/received via microphone 15 and speaker 16. The results are then displayed on LCD panels 11 and 12 for read-out by a user.

Figure 4:
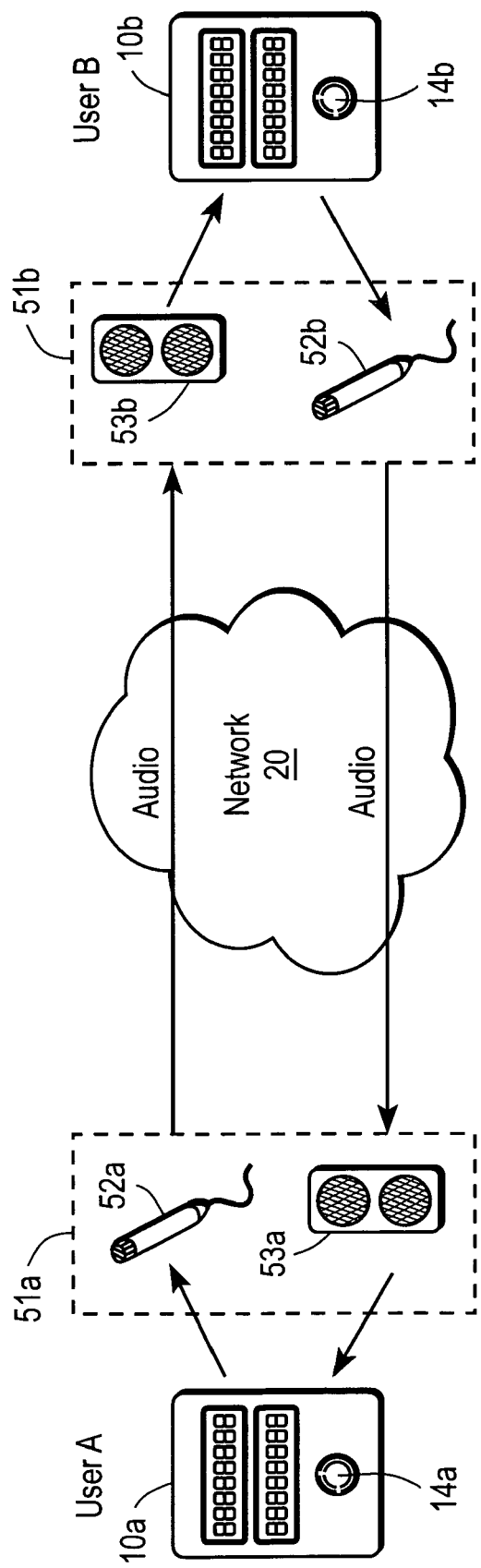
FIG. 4 illustrates an example network configuration for measuring round-trip audio latency.

FIG. 4 illustrates an example network configuration for measuring round-trip audio delay. In accordance with the embodiment of FIGS. 1-4, a delay or latency measurement is accomplished by two conference participants (users) utilizing a separate apparatus 10a & 10b, each of which is positioned within audible range of the user's respective endpoint devices (e.g., a VoIP phone or computer with softphone capabilities) 51a & 51b. Each of endpoint devices 51 are connected in a conference session via network 20. Conference sessions may utilize point-to-point or multi-point topologies and may exchange a variety of media, including voice and video. Each endpoint device includes a microphone 52 and a speaker 53. In general, an endpoint represents any end user, client, or person who participates in an audio/video conference session. Other endpoint devices not specifically shown in FIG. 4 that may be used to participate in a conference session (and also in a delay measurement) include a personal digital assistant (PDA), a laptop or notebook computer, a non-IP telephone device, a video appliance, a streaming client, a television device, or any other device, component, element, or object capable of initiating or participating in audio exchanges.

By way of example, user "A" may start the delay measurement process by positioning his apparatus 10a near endpoint device 52a and pressing button 14a. The pressing of start button 14a causes apparatus 10a to output a short, audible audio waveform ("ping" for short) having a predetermined duration (e.g., 200 ms) destined to user "B". At the same instant that apparatus 10a sends the ping, its CPU starts an internal timer. In one implementation, the ping itself may have specific acoustic waveform characteristics such that the ping can be detected unambiguously by apparatus 10b even after the waveform has been encoded, mixed, encrypted, decoded, etc. In other words, apparatus 10a & 10b are both programmed to emit/recognize a ping having specific, unambiguous waveform characteristics that resembles speech in order to pass through audio codecs on the network. Note that there is no requirement that each apparatus send a ping having the exact same waveform characteristics, only that each apparatus recognize the ping sent by the other side.

Figure 5:
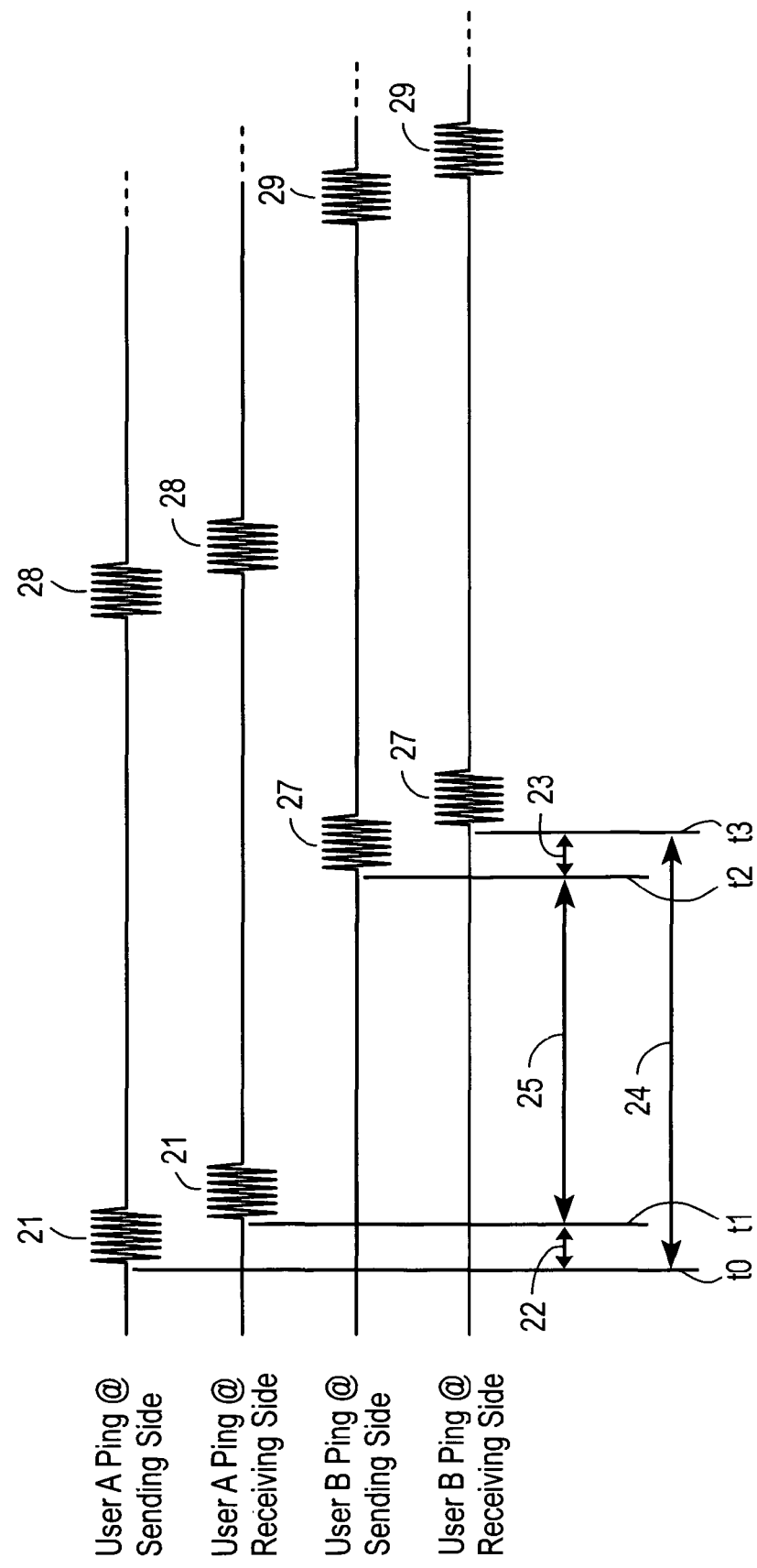
FIG. 5 illustrates an example audio signaling diagram for the network diagram of FIG. 4.

FIG. 5 illustrates an example audio signaling diagram for the network diagram of FIG. 3. The diagram shows user "A's" side sending a ping 21 at time $t=t_0$, which is captured by microphone 52a of endpoint device 51a. Endpoint device 51a encodes the audio waveform into one or more data packets and then sends the packets across network 20 to user "B's" endpoint device 51b. Endpoint device 51b receives the network audio data at time $t=t_1$ and plays ping 21 out of speaker 53b. The internal microphone of apparatus 10b positioned near endpoint device 51b detects the emitted waveform. Upon detecting ping 21, apparatus 10b delays for a fixed period of time (indicated by arrow 25) starting from the leading edge of the audio waveform, and then sends back a ping 27 over the network at time $t=t_2$. Ping 27 is captured by microphone 52b of endpoint device 51b, which then encodes the waveform and sends it across network 20 where it is received by endpoint device 51a and played out of speaker 53a at time $t=t_3$.

When apparatus 10a detects the leading edge of waveform 27 at time $t=t_3$ it stops its internal timer. The total elapsed delay time (shown by arrow 24) represents the sum of the mouth-to-ear delay 22 (i.e., the time it took waveform 21 to traverse from apparatus 10a to apparatus 10b), the fixed delay 25, and the mouth-to-ear delay 23 (i.e., the time it took waveform 27 to traverse from apparatus 10b to apparatus 10a). The CPU of apparatus 10a subtracts fixed delay 25 from total delay 24 to obtain the round-trip mouth-to-ear delay between endpoints 51a & 51b, which is the sum of the one-way delays 22 & 23.

It is appreciated that the reason why apparatus 10b waits for a predetermined duration of time to elapse before sending ping 27 back to apparatus 51a is to avoid computations being performed based on echo reflections rather than emitted waveforms. For instance, waiting one or two seconds is usually sufficient to dissipate any echo reflections across network 20. Note that after sending ping 21, apparatus 10a may reject any waveforms that it detects within that same time duration 25 (e.g., 1-2 seconds). In other words, every time a sending side emits a ping it may not accept any waveforms in response for a time period equal to duration 25 so as to ensure against making measurement computations based on echo reflections. Similarly, every time a receiving side detects a ping it waits or delays for the same time period before sending back a responsive ping to the other side.

The resulting round-trip delay may be stored in memory 18 and later recalled to obtain an average round-trip delay after repeated measurements. That is, the process of sending audio waveforms back and forth across the network may be repeated numerous times (as represented by waveforms 28, 29, and so on). After a sufficient number of measurements have been taken (e.g., a dozen) the process stops. CPU 17 then calculates the average round-trip delay and statistical variance and displays the results on LCD panels 11 & 12, respectively.

In addition to measuring the leading edge to leading edge time delays, the ping check apparatus may also perform calculations on the trailing edges of each waveform in order to better measure variance, or to determine whether the audio codecs are clipping one edge of the waveform, but not the other. For example, if the codecs are clipping the leading edges of the waveforms, then the apparatus may respond by creating a new waveform that starts with one frequency and switches to another frequency. The frequency switchover is then used as a timing reference point for delay timing and delay calculation purposes.

Practitioners in the art will appreciate that either user "A" or user "B" may start the measurement process by pressing start button 14a or 14b, respectively. In the described embodiment, the apparatus that started the measurement process is the side that ends it after a predetermined number of measurements (i.e., round-trip delay calculations) have been completed. Once the process of sending pings back and forth has stopped, both apparatus 10a & 10b may display the average round trip time and the variance. That is to say, both audio ping check devices may perform the round-trip delay calculations and statistical computations, and then display the results to the respective users at each side.

Figure 6:
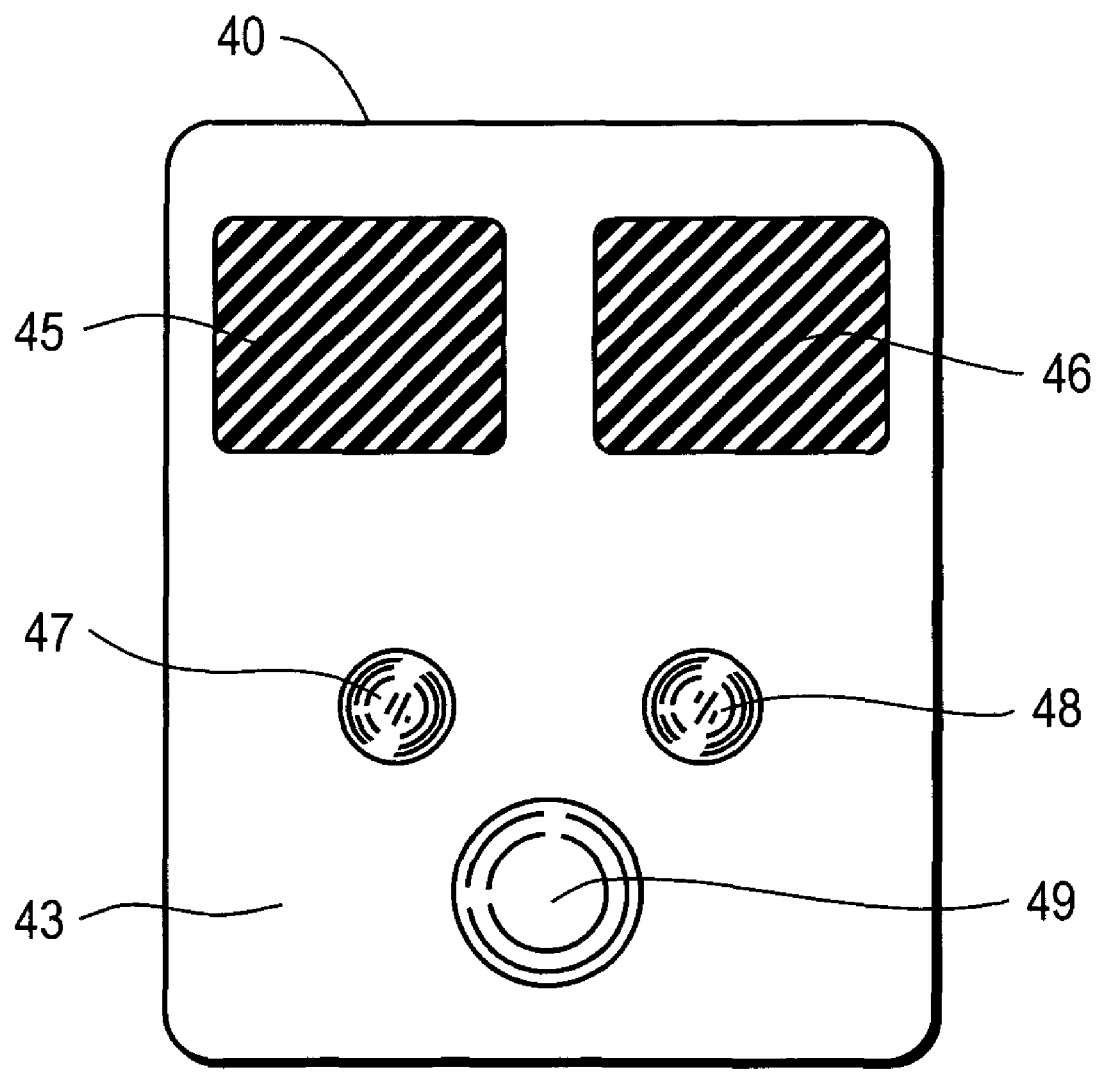
FIG. 6 is a rear view of an example latency measurement apparatus that can also measure lip synchronization.

FIG. 6 is a rear view of an example delay measurement apparatus 40 that can also measure lip synchronization skew, or "lipsync" for short. (Lipsync refers to the relative rendering time skew or offset between the audio and video packets transmitted across the network during an audio/video session.) Like apparatus 10, apparatus 40 comprises a housing 43 having a front side that includes a start button 14 and a pair of digital liquid crystal display (LCD) panels (shown in FIG. 7). The rear view of apparatus 40 shows a microphone 45, a speaker 46, a camera 49, and light-emitting diodes (LEDs) 47 & 48 of different colors (typically on opposite sides of the color wheel). In operation, LEDs 47 & 48 are attached to (i.e., positioned directly in front on a video conferencing endpoint camera so that the light from either LED saturates a large portion of the camera's field of view.

Figure 7:
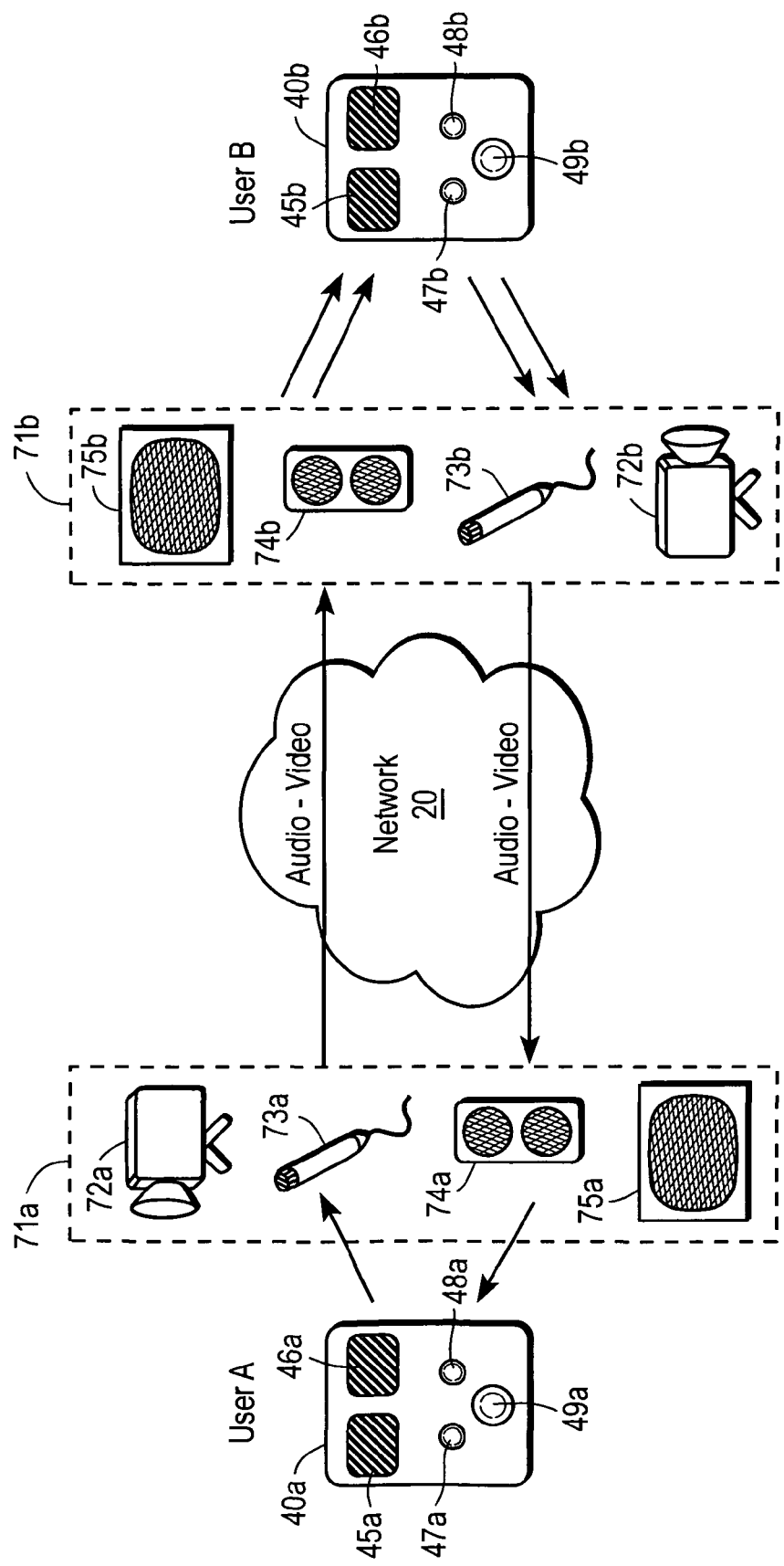
FIG. 7 illustrates an example network configuration for measuring lip synchronization.

FIG. 7 illustrates such an example network configuration, wherein video conferencing endpoints 71 are each shown including a camera 72, a microphone 73, a speaker 74, and a video monitor 75. To determine lipsync in the example configuration shown in FIG. 7, user "A" attaches LEDs 47a & 48a to camera 72a, and then presses start button 14a (not shown). In response, apparatus 40a emits a first unambiguous audio waveform from speaker 46a and simultaneously illuminates LED 47a for a predetermined time period (e.g., 2 seconds). Microphone 73a detects the audio waveform and camera 72a picks up the illuminated LED 47a. Endpoint 71a encodes the waveform and LED color flash into data packets which are then transmitted across network 20 to endpoint 71b on the other side.

Figure 8:
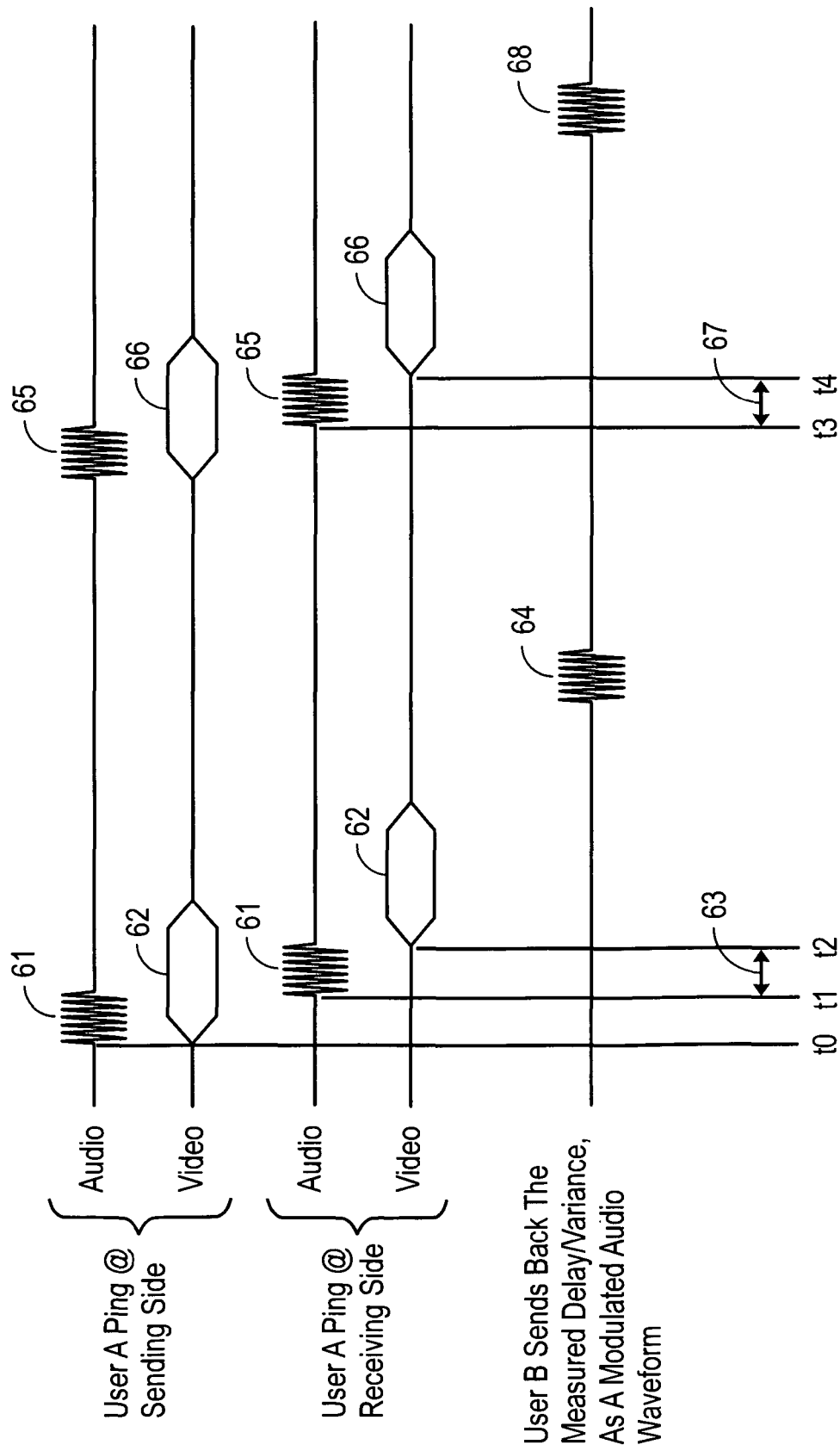
FIG. 8 illustrates an example audio/video signaling diagram for the network diagram of FIG. 7.

The example audio/video signaling diagram of FIG. 8 shows audio and video packets 61 & 62 respectively being sent by user "A" of endpoint 71a at time $t=t_0$. It is appreciated that waveforms 61 and 65—although similar in appearance in FIG. 8—are actually two distinct audio waveforms (packets). Additionally, the duration of each may vary considerably. For example, in certain embodiments—such as that shown in FIG. 9—the trailing edge of a first audio waveform 81a may extend in time such that it is coterminous with the leading edge of a second audio waveform 82a.

Figure 9:
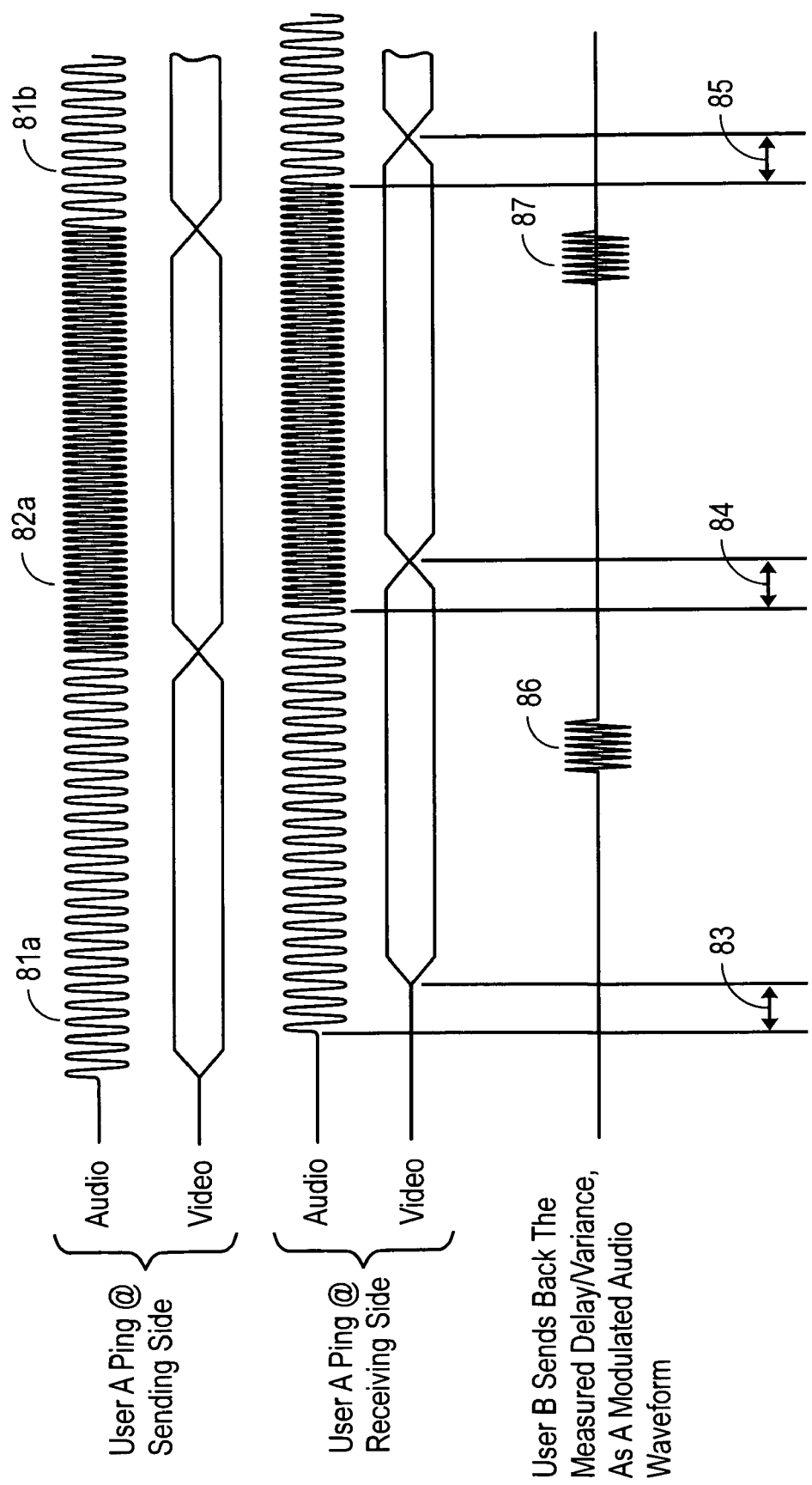
FIG. 9 illustrates an example audio/video signaling diagram for an alternative embodiment.

In the example of FIG. 9, the audio output of apparatus 40a alternates on a continual basis between first and second waveforms 81 & 82, each waveform having different characteristics. Similarly, the duration of the video (LED) flashes may extend to the point where the end of the first flash occurs at the start of the second flash. In other words, in the embodiment of FIG. 9 the audio and video outputs of apparatus 40a (the sending side) may continuously alternate between two different audio waveforms and two correspondingly different video color flashes. In operation, apparatus 40a may therefore be perceived as warbling between two different ping waveforms while flashing two different colors, with the transition points being used as a reference point for measuring and computing lipsync at the opposite side of the network (utilizing apparatus 40b). That is, the leading edges/transitions detected by apparatus 40b on the receiving side of the network may be used as a reference points for measuring and computing lipsync at the opposite side of the network (utilizing apparatus 40b). Apparatus 40b of user "B" is shown sending modulated audio waveforms 83-85 back to apparatus 40a Referring once again to the example of FIGS. 7 & 8, the first audio waveform emitted by user "A's" apparatus 40a at time $t=t_0$, is played out of speaker 74*b* of endpoint 71*b* at time $t=t_1$. About the same time, video packets 62 are received by endpoint 71*b*, which results in a color rendering (for 2 seconds) on the screen of monitor 75*b* at time $t=t_2$. Apparatus 40*b* is positioned near endpoint device 71*b* to detect the emitted audio waveform and video color image using microphone 45*b* and camera 49*b*, respectively. In this case, as soon as the leading edge of either waveform 61 or video flash 62 is detected by camera 49*b* (focused on display 75*b*), the CPU of apparatus 40*b* starts a timer, which is programmed to stop when the leading edge of whichever medium arrives last is detected.

Note that the acoustic waveform characteristics of waveform 61 are correlated to the color of video packet 62 in both apparatus 40. Thus, after detecting the leading edge of packet 62, apparatus 40*b* readily computes the lipsync skew 63, which represents the difference or delay between the leading edges of the transmitted image and waveform. It is appreciated that apparatus 40*b* is capable of measuring lipsync skew whether video packet 62 lags audio (arrives later than audio 61), or leads audio (arrives before packet 61). This information may be stored in the memory of apparatus 40*b* for use in computing an average lipsync and variance after a number of measurements have been taken. Alternatively, lipsync skew 63 may be encoded by apparatus 40*b* as a modulated audio waveform 64 and sent back to apparatus 40*a* on the other side, where it may be decoded and recognized as such. Likewise, at any point in the measurement process apparatus 40 may encode the average lipsync and variance and transmit this information to the ping check apparatus on the opposite side of the network.

FIG. 8 also shows a second unambiguous audio waveform 65 sent along with a second video flash 66 being sent simultaneously across network 20 by endpoint 71*a*. Video flash 66 and audio waveform 65 are generated by endpoint 71*a* in response to an illumination of LED 48*a* and a correlated audio waveform emitted by speaker 46*a* of apparatus 40*a*. Ping 65 is detected by apparatus 40*b* at time $t=t_3$, while the video image of packet 66 is detected by apparatus 40*b* at time $t=t_4$. FIG. 8 shows apparatus 40*b* responding to the respective audio and video outputs from speaker 74*b* and monitor 75*b* by sending a modulated audio waveform 68 that contains the lipsync skew 67 information back to apparatus 40*a*.

Practitioners in the art will appreciate that apparatus 40*a* on user "A's" side is normally placed directly against user A's camera lens so that the entire field of view of camera 72*a* is saturated with the color emitted by LEDs 47*a* & 48*a*. On user "B's" side, apparatus 40*b* is pointed or aimed in the general direction of monitor 75*b* so that a large portion of the field of view of camera 49*b* is subtended by the rendered video image. Apparatus 40*b* constantly monitors the video image produced by monitor 75*b* and becomes active once it detects the predetermined color flash, or a pre-set sequence of colors. In other words, the ping check apparatus on user "B's" side continuously monitors the received video, waiting for either one of the colors (or color combination) to trigger a lipsync skew measurement. It is appreciated that the use of two colors prevents apparatus 40*b* from inadvertently triggering a measurement off of colors that might naturally occur (e.g., reflections, video noise, etc.) in the received video image. In embodiments where the audio and video packet streams are continuous and composed of two distinct audio waveforms and two distinct color images the lipsync skew of a continuous talk burst is measured, rather than the skew resulting from the beginning of individual talk burst.

Note that in the example shown apparatus 40*b* may be configured and positioned with respect to endpoint 71*b* so as to transmit audio and video data packets back to endpoint 71*a* and apparatus 40*a* in the same manner described above in the embodiments of FIGS. 4 & 5. That is, average lipsync skew and variance may be determined by each apparatus 40 after a series of audio/video transmissions back and forth across network 20. Each apparatus may compute the average lipsync skew and send it to the opposite side in the form of a modulated audio waveform, which is, in turn, coded, packetized, and sent over the network by endpoint 71*b*; then received, de-packetized, decoded, and rendered by endpoint 71*a* such that apparatus 40*a* can detect the modulation and display the results. The average lipsync skew and variance results may be displayed on the LCD display panels of each apparatus.

In another embodiment, instead of detecting the leading edge of a color image or audio waveform, lipsync skew measurements may be triggered or referenced with respect to a color and/or audio frequency transition.

In still another embodiment, the software or firmware code implementing the function and operations described above may be installed or loaded onto a conferencing personal computer (PC), thereby obviating the handheld apparatus. In other words, the apparatus described in the above embodiments may be integrated or incorporated into the user endpoint device.

In yet another embodiment, the ping check apparatus on each side of the network may synchronize to a common reference clock, thereby enabling each apparatus to directly measure one-way delays (i.e., without performing a round-trip calculation and dividing by two). Synchronization to a common time reference may be achieved by placing the apparatus into a cradle that is configured to load or set reference clock information into the apparatus, e.g., the cradle is coupled with a PC that can connect to an NTP server. Synchronization to a common clock may also be accomplished using a GPS receiver, a cellular phone receiver, or other communication devices capable of transmitting reference time information.

In another embodiment, a single LED (or other light source) successively turns on and off (i.e., illuminates, stops, illuminates, stops) while the audio pings simultaneously outputs audio waveform bursts (i.e., pings, stops, pings, stops)—the transition edges being aligned with the transition edges of the audio waveforms. The apparatus located on the other side of the network then measures the separation between the flash being rendered on display 75*b* and the ping being output by loudspeaker 74*b* (both being received by apparatus 40*b*). Apparatus 40*b* then encodes the measured/computed lipsync and reports it back to apparatus 40*a* in the manner described above.

Using information provided by the cradle, the ping check apparatus may determine the transformation that maps the apparatus' internal crystal clock to the time reference (e.g., Ref=Xtal*scale+offset). Thereafter, when the ping check apparatus sends a ping tone, it aligns the leading edge of the ping tone to the nearest second, and includes information in its transmission that indicates which second the ping is aligned with (0, 1, 2, 3, 4, 5, 6, 7, 8, 9). In different embodiments, this indication can involve changing the frequency of the waveform, the duration of the waveform, or some other type of modulation. When the ping check apparatus at the other side detects the ping, it determines the precise second that the waveform was aligned with, thereby enabling it to calculate the one-way delay.

It should be understood that elements of the present invention may also be provided as a computer program product which may include a machine-readable medium that is non-transitory having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. Apparatus for determining a round-trip delay of a media stream in a conferencing or telephony system comprising:
   a speaker;
   a microphone; and
   a processing unit coupled with the speaker and the microphone, the processing unit being operable to output, via the speaker, a first audio waveform having a predefined duration for reception by a first endpoint device of the conferencing or telephony system, the first endpoint device encoding the first audio waveform into one or more data packets for transmission over a packet-based network to a second endpoint device of the conferencing or telephony system, the second endpoint device playing out the first audio waveform to another apparatus that responds by producing a second audio waveform, the first and second audio waveforms each having unambiguous characteristics that resemble speech, the second audio waveform being emitted after a delay of a fixed period of time, the second audio waveform being encoded by the second endpoint device and sent over the network to the first endpoint device, the first endpoint device playing out the second audio waveform, the microphone capturing the second audio waveform, the processing unit being further operable to calculate the round-trip delay across the packet-based network based on a time period measured from the output of the first audio waveform to the capturing of the second audio waveform without the use of timestamps, the processing unit subtracting the fixed period of time from the time period in calculating the round-trip delay, wherein the processing unit rejects any audio waveforms received during a duration substantially equal to the fixed period of time after the first audio waveform is outputted.

2. The apparatus of claim 1 wherein the first and second audio waveforms have identical waveform characteristics.

3. The apparatus of claim 1 further comprising a memory to store the round-trip delay.

4. The apparatus of claim 1 wherein the processing unit is configured to repeatedly measure the round-trip delay and calculate an average round-trip delay and a variance therefrom.

5. The apparatus of claim 1 further comprising a timer coupled with the processing unit, the timer starting upon the output of the first audio waveform and stopping upon the capture of the second audio waveform.

6. A method for determining a round-trip delay of a media stream in a packet-based conferencing or telephony system comprising:
   (a) outputting a first audio waveform at a first network connection to the packet-based conferencing or telephony system, the first audio waveform being encoded and sent by a first endpoint device to a second endpoint device at a second network connection to the packet-based conferencing or telephony system;
   (b) detecting a second audio waveform played out by the first endpoint device, the second audio waveform having been produced at the second network connection to the packet-based conferencing or telephony system in response to the second endpoint device playing out the first audio waveform, the first and second audio waveforms each having unambiguous characteristics that resemble speech, the second audio waveform being produced after a delay of a fixed period of time; and
   (c) calculating the round-trip delay over the packet-based conferencing or telephony system based on a time period measured from output of the first audio waveform to detection of the second audio waveform without the use of timestamps, the fixed period of time being subtracted from the time period in calculating the round-trip delay, wherein the first endpoint device rejects any audio waveforms received during a duration substantially equal to the fixed period of time after the first audio waveform is outputted.

7. The method of claim 6 further comprising:
   repeating (a)-(c) to produce a number of round-trip delay measurements; and
   computing an average round-trip delay and a variance based on the number of round-trip delay measurements.

8. The method of claim 7 further comprising displaying the average round-trip delay on a display.

9. The method of claim 6 wherein the first and second audio waveforms have identical waveform characteristics.

10. The method of claim 6 further comprising:
    detecting that an edge of the second audio waveform is clipped; and
    creating a new audio waveform that starts with one frequency and switches to another frequency as a point in time, the point in time being used as a timing reference point for calculating the round-trip delay.

11. The method of claim 6 further comprising:
    starting a timer when the first audio waveform is output;
    stopping the timer upon detection of the second audio waveform.

12. A computer-readable recording medium that is non-transitory encoded with computer instructions, which, when executed, cause a computer to perform a method comprising:
    starting a timer;
    encoding a first audio waveform;
    sending the encoded first audio waveform across the digital network, through the conferencing system, to a destination endpoint device;
    receiving an encoded second audio waveform sent from the destination endpoint device after a delay of a fixed period of time, the second audio waveform being encoded and sent across the digital network, through the conferencing system, responsive to the destination endpoint device receiving the first encoded audio waveform;
    decoding the second audio waveform, the first and second audio waveforms each having unambiguous characteristics that resemble speech, the decoded second audio waveform being produced after a delay of a fixed period of time;
    stopping the timer; and
    calculating the round-trip delay across the digital network based on a time period measured from the start to the stop of the timer without the use of timestamps, the fixed period of time being subtracted from the time period in calculating the round-trip delay, wherein the computer rejects any audio waveforms received during a duration substantially equal to the fixed period of time after the first audio waveform is outputted.

13. The computer-readable recording medium of claim 12 wherein the method further comprises:
   repeatedly measuring the round-trip delay to produce a number of round-trip delay measurements; and
   computing an average round-trip delay and a variance based on the number of round-trip delay measurements.

14. The computer-readable recording medium of claim 12 wherein the method further comprises displaying the average round-trip delay and the variance on a display associated with the computer.

15. The computer-readable recording medium of claim 12 wherein the timer is started responsive to input from a user.

\* \* \* \* \*